US006970861B2

(12) United States Patent
Messler (10) Patent No.: US 6,970,861 B2
(45) Date of Patent: Nov. 29, 2005

(54) WEB-BASED SYSTEM AND METHOD FOR ENGINEERING PROJECT DESIGN

(76) Inventor: Timothy J. Messler, 5746 Via Rio, Jupiter, FL (US) 33458

( * ) Notice: Subject to any disclaimer, the term of this patent is extended or adjusted under 35 U.S.C. 154(b) by 80 days.

(21) Appl. No.: 09/827,665

(22) Filed: Apr. 6, 2001

(65) Prior Publication Data
US 2002/0147517 A1 Oct. 10, 2002

(51) Int. Cl.[7] ............................................. G06F 17/30
(52) U.S. Cl. ................................. 707/3; 707/4; 707/2
(58) Field of Search ........................... 707/6, 101, 102, 707/103, 104, 505, 2, 3, 4; 705/7; 395/207; 434/322, 323; 345/327

(56) References Cited

U.S. PATENT DOCUMENTS

| | | | |
|---|---|---|---|
| 5,878,408 A * | 3/1999 | Van Huben et al. ............. 707/1 |
| 6,063,128 A * | 5/2000 | Bentley et al. ................. 703/6 |
| 6,157,915 A * | 12/2000 | Bhaskaran et al. ............. 705/7 |
| 6,161,113 A * | 12/2000 | Mora et al. .................... 715/505 |
| 6,236,994 B1 * | 5/2001 | Swartz et al. .................... 707/6 |
| 6,381,610 B1 * | 4/2002 | Gundewar et al. ........ 707/104.1 |
| 2002/0107788 A1 * | 8/2002 | Cunningham ................. 705/38 |
| 2002/0138391 A1 * | 9/2002 | Kroeger ......................... 705/37 |
| 2004/0073507 A1 * | 4/2004 | Scott et al. .................... 705/37 |

* cited by examiner

Primary Examiner—Charles Rones
Assistant Examiner—Neveen Abel-Jalil
(74) Attorney, Agent, or Firm—McHale & Slavin, P.A.

(57) ABSTRACT

A system and method of engineering project design using a real-time interface with a global computer network comprises a database for approved engineering specific Universal Record Locator (URL) links which is indexed according to predetermined engineering search queries. The URL database is in communication with an Internet server and is accessed by a user via a Web browser. A graphical user interface (GUI) is provided which allows a user to perform a categorized database inquiry for an engineering project for using a cascading drop-down menu process for a selected engineering project. A design process template is provided for a specific engineering project which includes formulas and a menu for the project. The user inputs critical parameters regarding the specification and requirements for the engineering project, and iterative calculations are performed to arrive at an acceptable final design using material and component data retrieved from Web pages. Permit and regulatory information based on the geographic location of the project is also obtained from Web pages. A Job Folder Checklist is provided to receive and document all relevant information for the engineering project.

11 Claims, 7 Drawing Sheets

Job No. 123 Folder Checklist

View  Action  Help

- ☑ Design Tables
- ☐ Reference Calculations
- ☑ Materials Selection
- ☑ Components Selection
  - ☐ [Component A]
  - ☑ [Component B]
- ☑ RFI List
- ☑ RFP List
- Regulations
  - Federal
  - State
  - County
  - Municipal
- ☑ Permits
- ☐ Construction Procedures

§ 53.12 PLANNING, CONSTRUCTION OF WATER DISTRIBUTION SYSTEMS.

All planning and construction of water distribution systems within the town shall conform with this section, state laws applying to health regulations, and the following regulations.
(A) Preliminary report. Prior to the preparation of construction drawings, the design engineer shall submit a preliminary report to the town establishing the elements of the proposed engineering design. This submittal is intended to inform the town of all aspects of the engineering design and assist in planning for the future. The preliminary report will be reviewed by the Town Engineer and returned with approval or appropriate comments within 15 days. The report shall contain at least the following information.
(1) A map of the proposed distribution system, showing its location and relationship to the existing system, or any other system that may be affected by the proposed construction.
(2) Pipe sizes and approximate lengths.
(3) Location of fire hydrants.
(4) Design criteria, including the following.
(a) Lots or tracts to be served.
(b) Population designed to be served.
(c) Hydraulic computations justifying pipe sizes larger than six inches in diameter.
(d) Location and method of connection to the existing system.
(B) Construction drawings. All construction drawings shall comply with the preliminary report and shall be done in ink on 24 by 36 inch mylar reproducible materials provided by the town and imprinted with their title block. Each drawing shall provide space for the name, address, registration

WEB-BASED SYSTEM AND METHOD FOR ENGINEERING PROJECT DESIGN

FIELD OF THE INVENTION

This invention relates generally to the field of information retrieval, and more specifically to a Web-based system and method for conducting research pertaining to engineering project data, and for providing an engineering design process having a real-time interface with Internet resources.

BACKGROUND OF THE INVENTION

The global computer network known as the Internet is based on standard protocols that allow computers to communicate with each other even if using different software vendors, thus allowing anyone with a computer global accessability to servers and databases connected to the Internet world wide. The wealth of available information makes the Internet a valuable tool for technical research and engineering design applications. Using a Web browser, a user can access Web sites containing databases of industry standard information for materials and components, online university engineering information, design calculators, manufacturer information, and relevant regulatory information.

Searches of the Internet are typically conducted using powerful search engines, such as ALTA VISTA, YAHOO, EXCITE, GOOGLE, and HOTBOT. These search engines are content dependent and queries are conducted as keyword searches using Boolean operators. The limitations of the search engine algorithms can result in multiple irrelevant responses to a keyword query, making such a search extremely time consuming and labor intensive. For example, a keyword search for "pump" and "lift station," as might be conducted by a civil engineer seeking product data, would return any number of documents which happen to include the keywords.

Another drawback is that the search engines are capable of searching only a fraction of the Internet's content. Most search engines search at most only the home page of a Web site, and data embedded in the site will not be located by the search engine. Web site information can be "stacked" in multiple layers, requiring the searcher to "sift" through the layers a time-consuming process to locate usable data. The desired information can also be in an "unsearchable" format such as Adobe Acrobat® (".pdf") documents and ASCII text, and again, would not turn up in a standard search engine query.

Additionally, due to the wide accessibility of the Internet, information retrieved from the Internet may be from a source of questionable legitimacy. The results returned by a search engine in response to a user query are not "screened" for the accuracy and validity of the information, and it is therefore up to the user to make this determination.

Another drawback associated with the search engine databases is that links are often moved or deleted after the search engine indexes the sites. This results in search results with numerous "dead ends." It is also possible to manipulate the content of a Web site to cause the search engine to artificially rank the site higher in relevancy than other Web sites, which can cause misleading search results.

In view of the inherent limitations and inefficiency of Internet search engines, particularly with regard to locating technical and engineering data, it would be desirable to catalog technical information available on the Internet so as to provide a method which will allow a user quickly and conveniently access the information.

SUMMARY OF THE INVENTION

It is an object of the invention to provide a Web-based method for engineering project design and engineering research for a plurality of engineering disciplines.

It is another object to provide a database of URL links indexed to allow a user to readily locate a Web page using a predefined search system.

It is still another object to provide a graphical user interface which allows a user to query the URL data using a cascading drop-down menu process.

It is a further object of the invention to provide a database of URL links which are categorized by engineering disciplines and conventional engineering projects within the engineering disciplines.

It is yet a further object of the invention to provide a method for performing information retrieval from multiple databases without he use of keyword-type search engines It is still a further object of the invention to provide a method which arranges and permits access to existing databases currently stored on multiple computer systems and formats it in such a way that it can be retrieved at any discrete location within the various levels of the databases.

It is still another object of the invention to provide a engineering design process having a real-time interface with Internet resources.

It is yet another object of the invention to systematically insert the retrieved information into a Job Folder Checklist, which will contain all the information necessary for a user to put together a total job package.

In accordance with the above objects, a method of engineering project design using a real-time interface with a global computer network comprises creating a database for approved engineering specific Universal Record Locator (URL) links and indexing the database according to predetermined engineering search queries. The method includes providing a graphical user interface (GUI) allowing a user to: (i) perform a categorized database inquiry for an engineering project by using a cascading drop-down menu process, (ii) input critical parameters regarding the specification and requirements for the engineering project; and (iii) compile project information into a job folder checklist. The URL links are retrieved according to the database inquiry, and Web pages related to the retrieved URL links are accessed to display pertinent information of the accessed Web pages. The information is then inserted into the job folder checklist.

The method of engineering project design further includes displaying of a plurality of engineering disciplines, listing of conventional engineering projects within each engineering discipline, and providing a design process template for each engineering discipline integrated into the GUI. The design process template prompts a user to input the required parameters for the engineering project. The design process template includes formulas for a selected engineering project and a drop-down menu for a selected engineering project.

The method further includes the steps of performing iterative calculations to arrive at an acceptable final design and inserting the design data into the job folder checklist. The iterative calculations are based on material specifications, component specifications, and design tables acquired from a Web page review. The method further includes the step of displaying and printing of a flow diagram detailing the engineering project.

The method also includes the step of inputting the geographic location of the engineering project, and retrieving regulatory data from a Web page review which conforms to a specific geographical location The invention further includes the step of printing a report on the engineering project based on information in the completed job folder checklist.

BRIEF DESCRIPTION OF THE FIGURES

FIG. 3B illustrates an alternative arrangement of the job folder checklist;

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
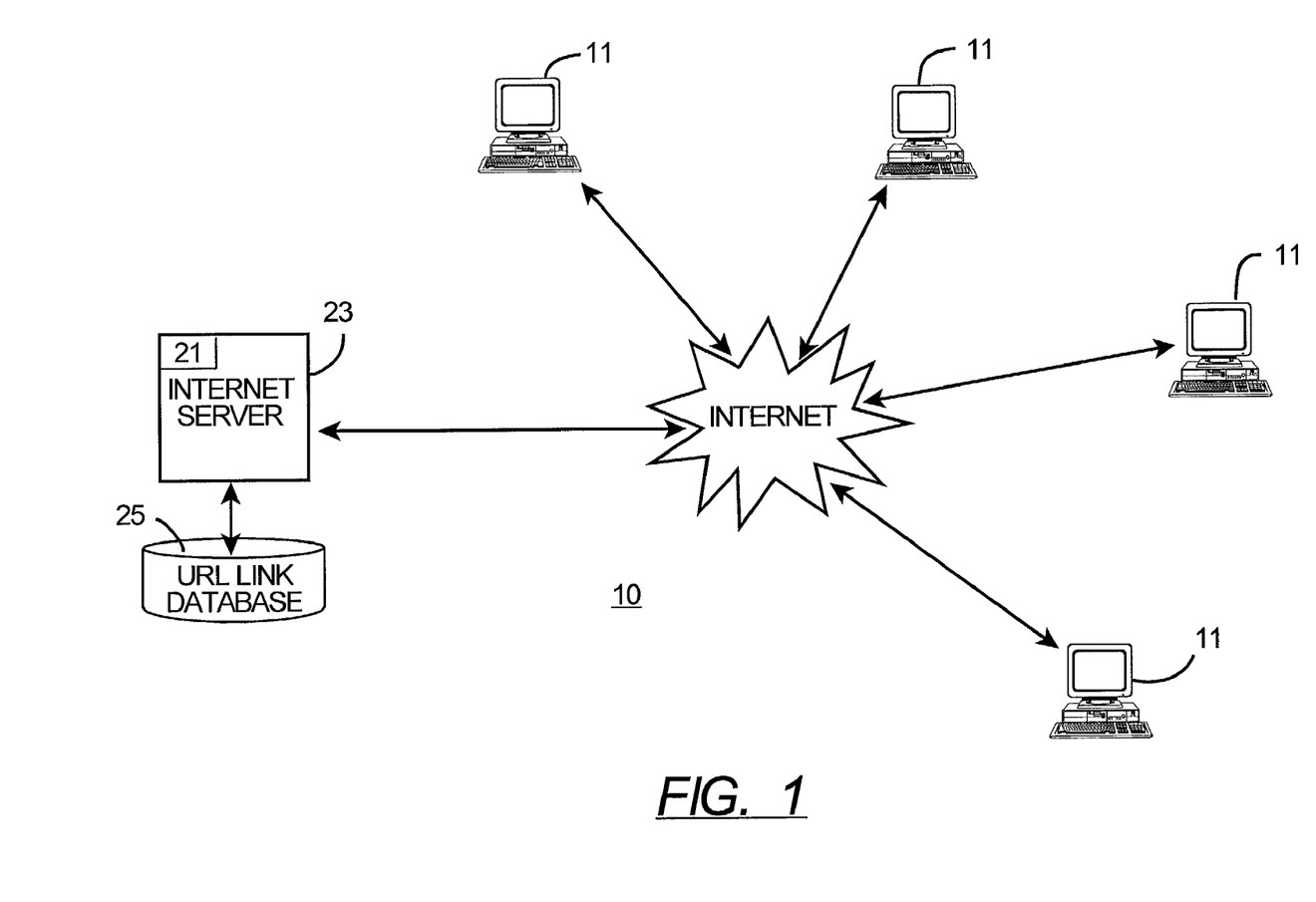
FIG. 1 is a schematic illustration of a computer system configuration in which the invention is used in a preferred embodiment.

In FIG. 1 illustrates a typical computer/network configuration in which the present invention is used in a preferred embodiment. One or more client workstations 11 are in bidirectional communication with a network via a Web browser program running on the client workstation. The network may be a local area network (LAN), wide area network (WAN), or the Internet. The web browser running on the client workstations 11 is a software program that allows a user at the client workstations 11 to transmit and receive data over a computer network such as the Internet. Client workstations 11 can be any computer that is capable of providing access to the web server using a web browser, such as standard desktop computer systems, laptop computers, non-programmable terminals connected to a main frame, etc.

The client workstations 11 are coupled to an Internet server 23. In the preferred embodiment, the Internet server 23 operates in Hypertext Transfer Protocol (HTTP). HTTP is a communications protocol that supports distributed collaborative information systems over the Transmission Control Protocol/Internet Protocol (TCP/IP) packet based routing system used by the Internet. HTTP defines how messages are formatted and transmitted, and what actions Web servers and browsers should take in response to various command. HTTP request methods to access network resources include the Uniform Resource Identifier (URI); Uniform Resource Locator (URL); or Uniform Resource Name (URN). Other HTTP request methods include Simple Mail Transport Protocol (SMTP) and File Transport Protocol (FTP). A network resource is a network server or database which can be identified by a URI, URL, or URN. For example, the URL "http://www.name.com/file.html" specifies a web page that should be retrieved using HTTP protocol, and URL "ftp://www.name.com/file.exe" specifies an executable file to be retrieved using FTP protocol.

Internet server 23 is in communication with a URL database 25 which consists of a plurality of cataloged URL links. The protocols by which Internet server 23 communicates with URL database 25 are well known in the art, and are not discussed in detail herein. The URL links preferably correlate to Web pages which are approved, pre-selected engineering specific Web sites. Such sites include, but are not limited to, manufacturer sites for materials and components, regulatory information, library references, contractor sites, university sites, ASTM references, ANSI references, military references, etc. The URL links in the database 25 are indexed according to pre-determined engineering search queries. As will be described in detail hereinafter, the method of the invention allows users at client workstations 11 to receive a specific URL link in response to a predefined engineering query, allowing the user to access the desired Web site using a Web browser. The method of the present invention provides the user direct access to multiple layers of detailed information without having to conduct a time-consuming search through layers of information using a search engine.

Internet server 23 includes a software application 21 running thereon which can be accessed through a Web site from a client workstation 11 via a Web browser. Alternatively, the software application 21 can be resident on the local media of the client workstation 11. The software application 21 provides a Graphical User Interface (GUI) at client workstation 11. The software application 21 coordinates with the URL database 25 to provide responses to user queries executed through the GUI. The GUI provides a means to direct a user at a client workstation 11 through hierarchal levels of information in predetermined search categories. In a preferred embodiment, the GUI utilizes a cascaded drop down menu process.

In the preferred embodiment of the invention, software application 21 allows a user (1) to select a specific engineering discipline, such as civil, electrical, mechanical, etc., and then (2) to select a specific type of engineering project within the discipline. The projects are standard, well-known project types within the disciplines with known requirements, parameters and algorithms. The project types are common to the respective industries and preferably have standard titles recognizable by all users.

Figure 2:
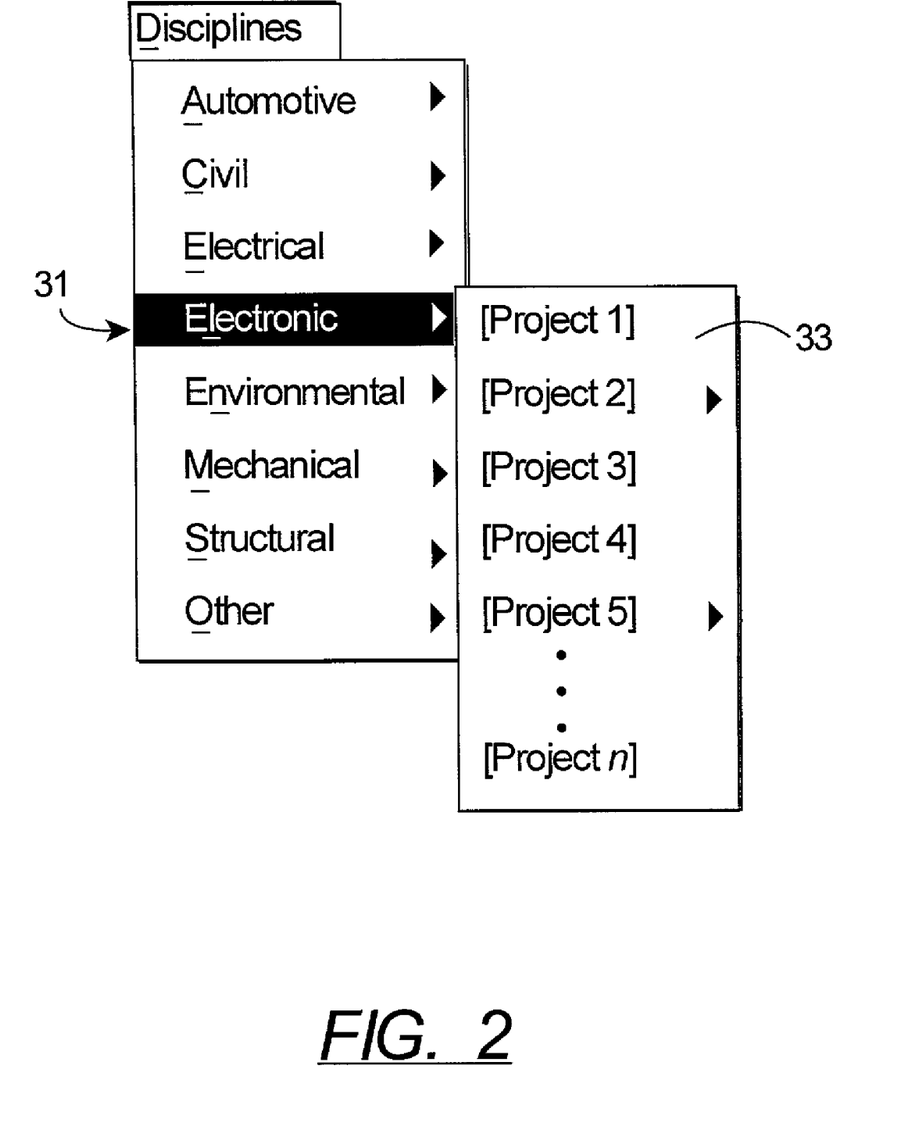
FIG. 2 is an example of a drop-down menu for engineering discipline selection according a preferred embodiment of the present invention.

FIG. 2 illustrates a drop down menu selection process provided by the GUI to select the discipline and project. Each discipline corresponds to a plurality of projects within the disciplines. In the illustrated example, a user has selected "Electronic" engineering 31, and a list of predetermined projects 33 in the electronic engineering field is then displayed. The projects can include subcategories of projects accessed by cascading submenus.

Figure 3A:
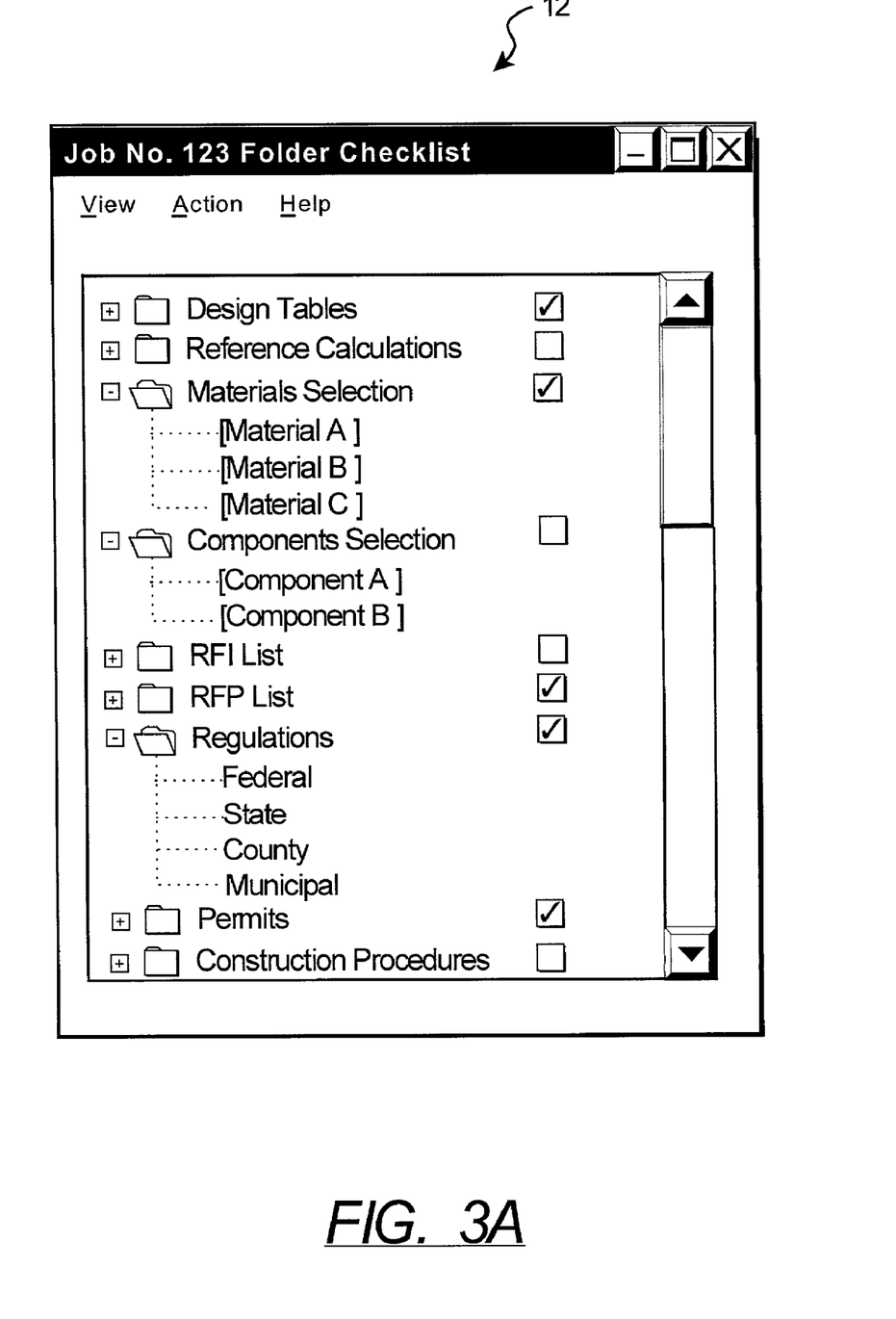
FIG. 3A illustrates a job folder checklist on a display screen according a preferred embodiment of the present invention.

The GUI also displays a "Job Folder Checklist" which corresponds to the selected engineering project. An example Job Folder Checklist 12 is illustrated in FIG. 3A. The Job Folder Checklist itemizes the data and required research and reference materials for the project. The elements of the Job Folder Checklist can include, but is not limited to, design tables, calculations, selected materials, selected components, RFI and RFP lists, regulatory information, permit information, and a detail of the construction process. The format of the Job Folder Checklist 12 allows a user to insert information and data as it is obtained for future reference. The Job Folder Checklist 12 also preferably includes a means to graphically "check off" the required items as the information is gathered to provide a visual indication of the status of the project. The graphical format shown in FIG. 3A is for illustrative purposes only, and the Job Folder Checklist of the present invention can have any suitable graphic format. As shown in FIG. 3B, the Job Folder Checklist 12 can include an additional window 14 which can be toggled on and off to view individual information items saved in the Job Folder Checklist 12. Some of the information to be inserted into the Job Folder Checklist 12 will be data retrieved from Internet sources. Since the retrieved data originates from different sources, it may be in a variety of formats, such as HTML files, .pdf files, text files, graphic files, jpg files, etc. The information inserted in to the respective categories of the Job Folder Checklist are therefore preferably maintained as discrete files within the Job Folder Checklist. In this way, the appropriate application can be launched to access the saved data in the Job Folder Checklist.

Figure 4A:
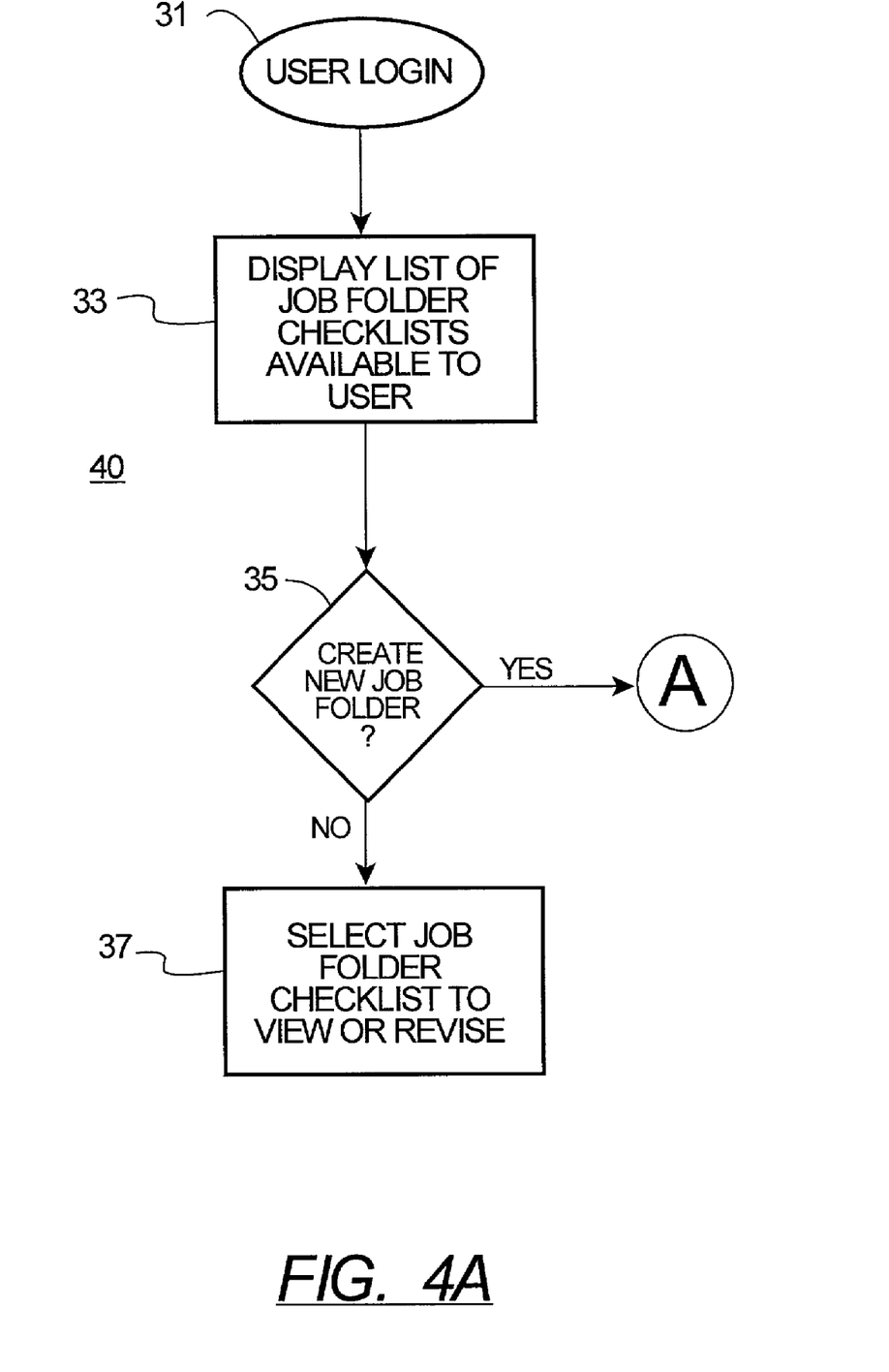
FIGS. 4A and 4B are a flow chart of the steps for creating the job folder checklist according a preferred embodiment of the present invention.

A first set of steps performed by the software application 21 is shown in FIG. 4A. A user at client workstation 11 initially logs onto Internet server 23 via a Web site preferably by providing account qualifier data 31. Account qualifier data can consist of an account number or a password, singly or in combination. Once logged onto Internet server 23, enumerated Job Folder Checklists which have been previously saved by the user or the account holder are displayed. The user is prompted to select "Create New Job Folder" or "Modify Existing Job Folder." If the user elects to "Modify Existing Job Folder," the user selects a Job Folder for further revision or review.

Figure 4B:
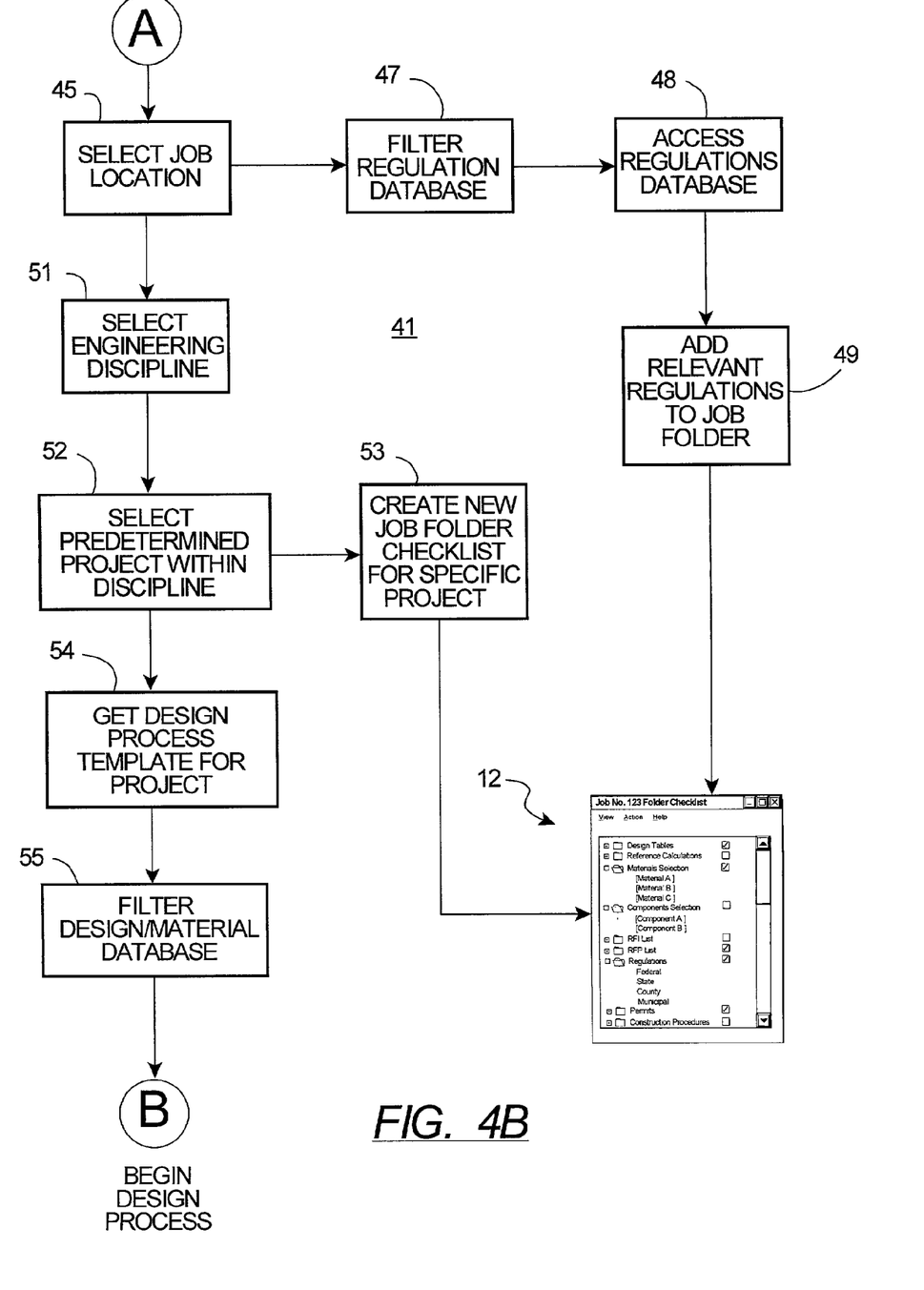

The steps performed to create a new Job Folder Checklist are shown in FIG. 4B. The user is prompted to select a location where a job is to be performed 45. This process can be achieved through a number of methods known in the art, such as by inputting a postal code. Once the location has been identified, the URL database is filtered 47 so that only data relevant to the selected location is displayed. However, the user has the option to override the filtering step and choose other regulations based on their knowledge of the project requirements. If regulation is chosen outside the filtered database, a cautionary note can be added identifying a potential risk to meeting requirements.

A user accesses a regulation data base using a drop down menu process 48. The regulation data base preferably includes federal, state, county and local regulations for the selected location. Regulatory information relevant to the location is displayed on the menu. Through the GUI menu, the user can then obtain the URL information for the desired regulations, and access the Web site containing the information. Pertinent regulatory information can then be located and added to the Job Folder Checklist 12 (step 49). When all regulations have been located, the appropriate box is then preferably automatically checked off.

In steps 51 and 52, the engineering discipline and project selected in the manner described above. As stated previously, the elements of the Job Folder Checklist 12 are then "customized" for the specific project. In addition, a design template for the specific project is accessed 54 and integrated into the GUI. The elements of the design template can include an input screen for user input of required parameters for the project. The design template also preferably includes the necessary formulas for performing the required calculations for the project. In the preferred embodiment, on-screen calculators are provided. The design template also includes flow chart forms for the specific project which can be edited by the user. After the design template is integrated into the GUI, the drop-down menu is preferably "customized" for the specific project. In step 55, the URL database is preferably filtered based on the project selection so that the user does not have to sort through extraneous information in the design process.

Figure 5:
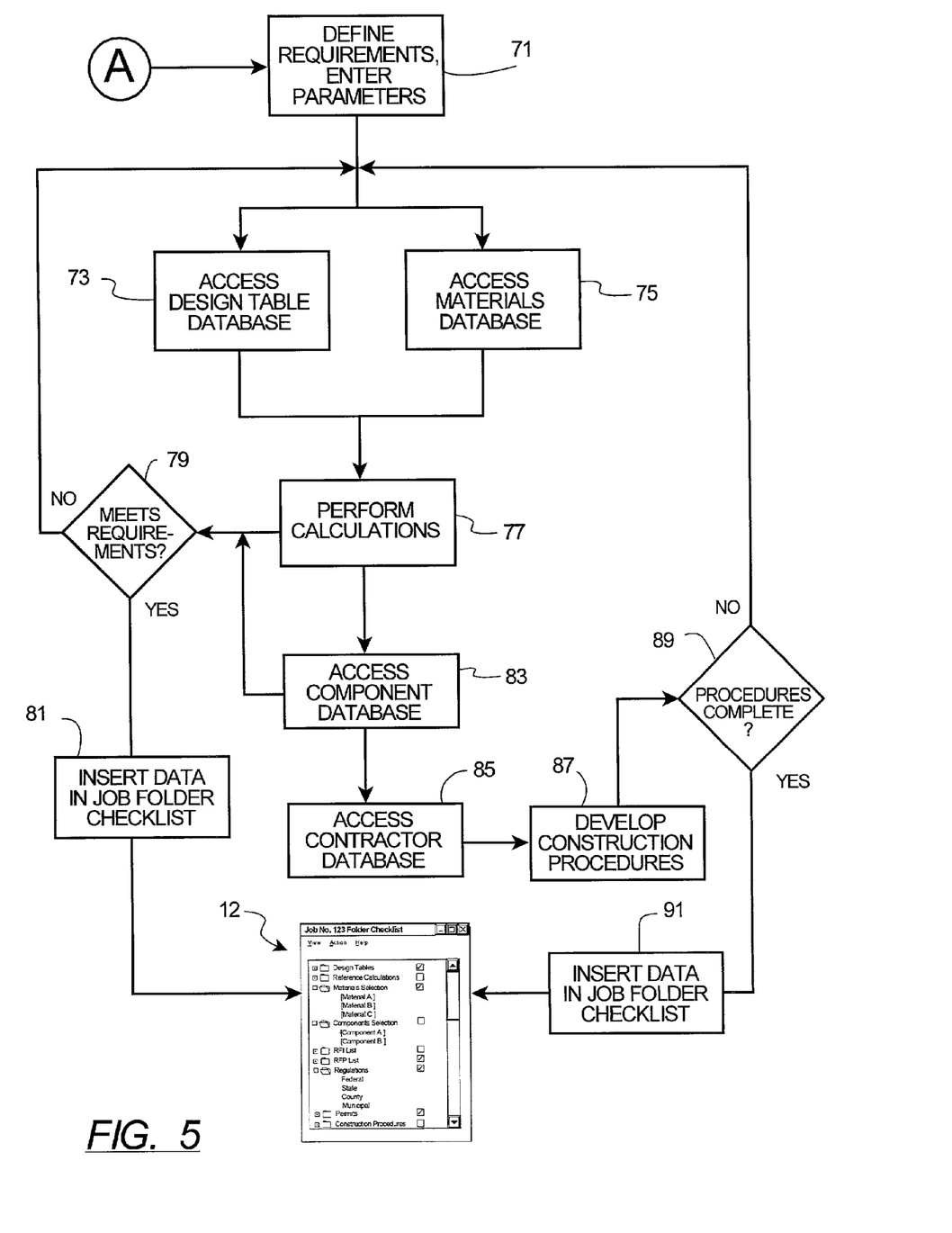
FIG. 5 is a flow chart of the design process.

After the required parameters for the project are entered, the user can begin the design process. The steps of a design process 50 according to the method of the invention is illustrated in FIG. 5, however the invention is not limited in this regard. The design process of the invention can follow any desired sequence to achieve the desired results.

The user initially enters the parameters for the project 71. The parameters consist of the project specifications and requirements for the particular job. Using the GUI, the user can obtain required information by accessing relevant Web sites on the Internet. The sites are pre-selected and approved engineering sites, thus eliminating the need to search for information using a keyword search engine. The indexed URL database 25 returns the address for the target Web site, allowing the user to immediately access the site. The user can access a design table database 73 and a materials database 75. The materials selected have material properties that impact the design calculations. Using the information from the design table database and the materials database, the user can performs calculations 77 using the project calculators. The process can be repeated in an iterative process 79 until the requirements are met. The user can then select components by first accessing the component database 83. Again, the selection process is iterative, and the specifications are revised until the requirements are met. If desired, the user can also factor in monetary costs into the process by using, for example, supplier price lists. After it is determined that the design specifications are optimized, the design data is inserted in the job folder checklist 81, along with pertinent design tables and material specifications. As each piece of information is transitioned in to the Job Folder Checklist 12, the appropriate boxes are automatically checked off.

The user can access a contractor database 85 to develop construction procedures 87. The construction procedures are iteratively formulated 89, and are inserted into the job folder checklist 91 when finalized. The construction procedures can be inserted into a project flow chart template.

After the design process 50 is complete, the completed Job Folder Checklist 12 includes the specification data for the optimal design of the project. The completed Job Folder Checklist 12 also contains other relevant information required for the project including reference materials, design tables, regulatory information, drawings, etc. The Job Folder Checklist 12 can also include procedural flow charts for the job to be performed.

The Job Folder Checklist 12 can be saved and archived on Internet server 23, and is preferably password protected for security. The contents of the completed Job Folder Checklist 12 can be printed in an industry recognized format, or it can be accessed electronically by other authorized users.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A method of engineering project design using a real-time interface with a global computer network, said method comprising:
creating a database based on publicly accessible data located in www sites for approved engineering specific Universal Record Locator (LTRL) links;
indexing said database according to predetermined engineering search queries;
providing a graphical user interface (GUI) allowing a user to:
(i) perform a categorized database inquiry for an engineering project by using a cascading drop-down menu process;
(ii) input critical parameters regarding the specification and requirements for the engineering project;
(iii) input a specific geographic location of the engineering project; and
(iv) compile project information into a job folder checklist;
providing a design process template;
retrieving URL links according to the database inquiry;
displaying the retrieved URL links as menu options and accessing www Web pages related to the retrieved URL links in response to user selection;
retrieving URL links to regulatory data for the specific geographic location from a regulation data base of URL links and displaying the URL links to regulatory data as menu options:
retrieving URL links to permit information for the specific geographic location from the regulation data base of URL links and displaying the URL links to permit information as menu options;
retrieving construction procedures from URL links providing a contractor database;
iteratively formulating constriction procedures based on specifications acquired from a Web page review;
inserting the construction procedures into a project flow chart template; and
displaying pertinent information of the accessed Web pages and inserting the information into the job folder checklist.

2. The method of engineering project design according to claim 1, wherein the design process template prompts a user to input the critical parameters for a selected engineering project.

3. The method of engineering project design according to claim 1, wherein the design process template includes formulas for a selected engineering project.

4. The method of engineering project design according to claim 1, wherein the design process template includes a drop-down menu for a selected engineering project.

5. The method of engineering project design according to claim 1, wherein said iterative calculations are repeated to arrive at an acceptable final design.

6. The method of engineering project design according to claim 5, wherein said iterative calculations are based on material specifications acquired from a Web page review.

7. The method of engineering project design according to claim 5, wherein said iterative calculations are based on component specifications acquired from said Web page review.

8. The method or engineering project design according to claim 5, wherein said iterative calculations are based on design tables acquired from said Web page review.

9. The method of engineering project design according to claim 1 including the step of displaying and printing of a flow diagram detailing the engineering project.

10. The method of engineering project design according to claim 1, further including the step of displaying and printing of selected components selected during the Web page review.

11. The method of engineering project design according to claim 1, further the step of printing a report on the engineering project based on information in the job folder checklist.

* * * * *